Feb. 22, 1966　　　V. J. VICKERS ETAL　　　3,237,032
DYNAMO-ELECTRIC MACHINES
Filed July 20, 1961　　　　　　　　　　　　3 Sheets-Sheet 1

INVENTORS:
VALENTINE JOHN VICKERS
WILLIAM ALFRED PEARSON

By: Stevens, Davis, Miller & Mosher
Attorneys

Feb. 22, 1966  V. J. VICKERS ETAL  3,237,032
DYNAMO-ELECTRIC MACHINES

Filed July 20, 1961  3 Sheets-Sheet 2

INVENTORS:
VALENTINE JOHN VICKERS
WILLIAM ALFRED PEARSON

By: Stevens, Davis, Miller & Mosher
Attorneys

United States Patent Office 3,237,032
Patented Feb. 22, 1966

3,237,032
DYNAMO-ELECTRIC MACHINES
Valentine John Vickers and William Alfred Pearson, Stafford, England, assignors to The English Electric Company Limited, London, England, a British company
Filed July 20, 1961, Ser. No. 125,422
Claims priority, application Great Britain, Aug. 2, 1960, 26,718/60
4 Claims. (Cl. 310—57)

This invention relates to dynamo-electric machines of the kind in which a gaseous cooling medium is circulated round a closed circuit within the machine.

More particularly this invention relates to dynamo-electric machines in which the gaseous cooling medium circulates round the closed circuit and primarily effects cooling of the machine rotor, and in which a separate cooling system is provided for effecting cooling of the machine stator.

According to one feature of the invention, in a dynamo-electric machine in which a gaseous cooling medium is circulated within the machine by a blower mounted at one end of the rotor shaft, at least some of the gaseous cooling medium within the housing, after passing through passages in the rotor, passes firstly to a first stage cooling means, then through the blower, then through a second stage cooling means, and finally back to the cooling passages in the rotor.

Further features of the invention will appear from the following description with reference to the accompanying drawings which show, by way of example, a turbo-alternator embodying the invention.

Figure 1:
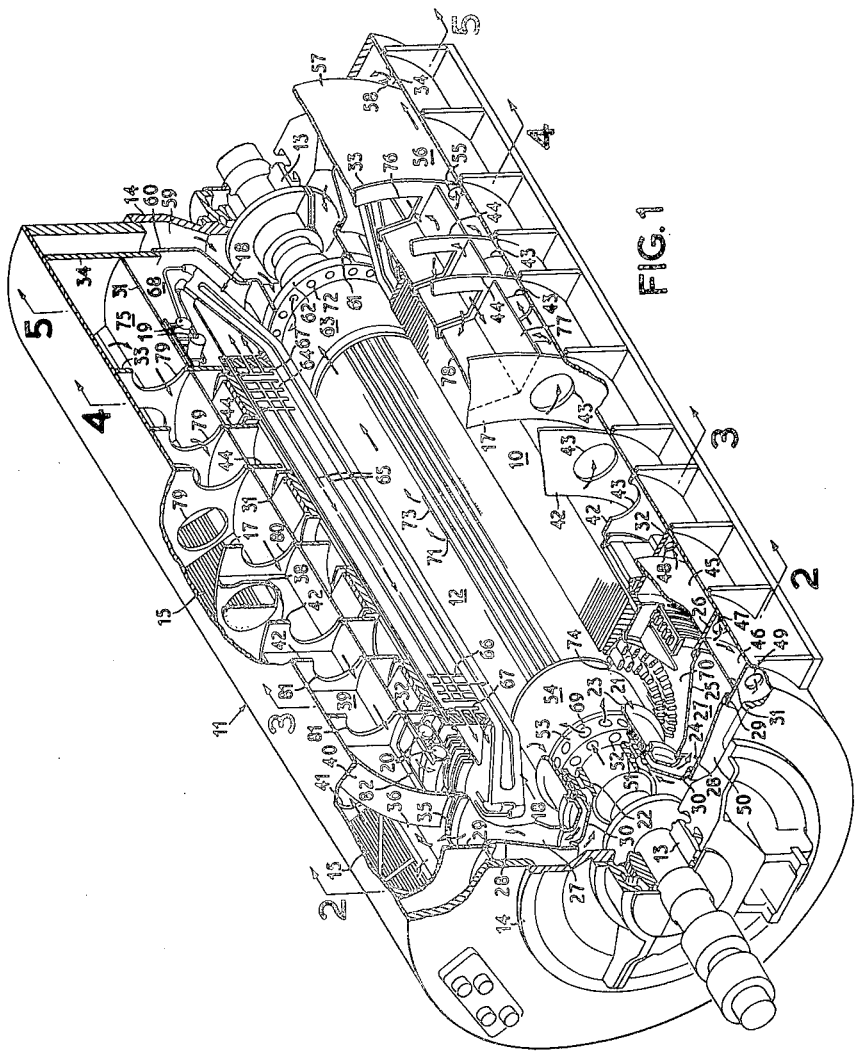
FIG. 1 is an isometric view, partly broken away, of the turbo-alternator.

Referring now to the drawings the laminated stator core 10 is mounted eccentrically in known manner in a fabricated stator frame 11, the rotor 12 being journalled in bearings 13 carried by bearing end brackets 14.

Figure 2:
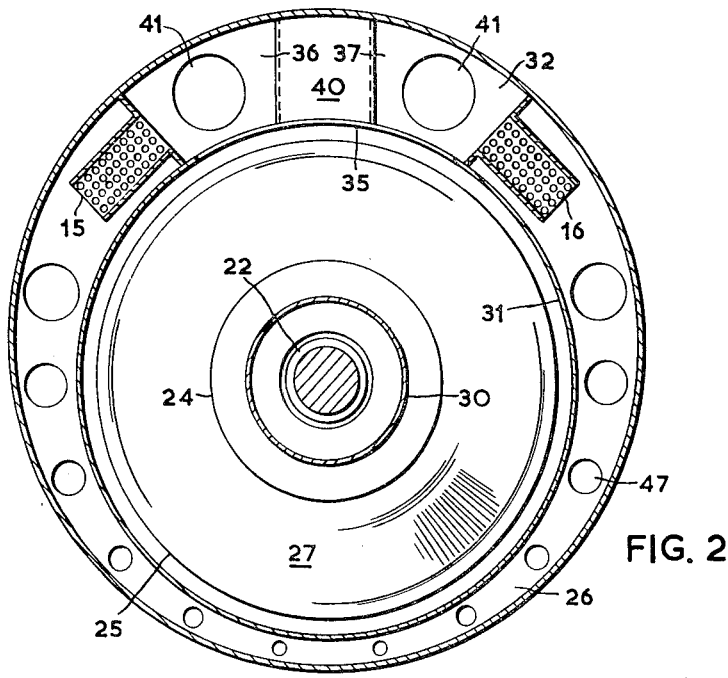
FIGS. 2 to 5 are sectional views of the turbo-alternator taken on the lines 2—2, 3—3, 4—4, and 5—5 of FIG. 1 respectively.
Figure 3:
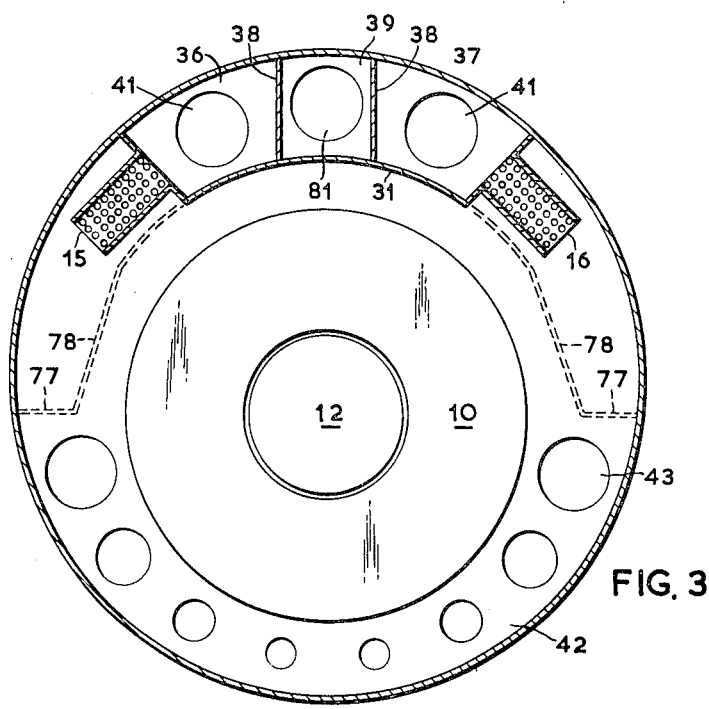
Figure 4:
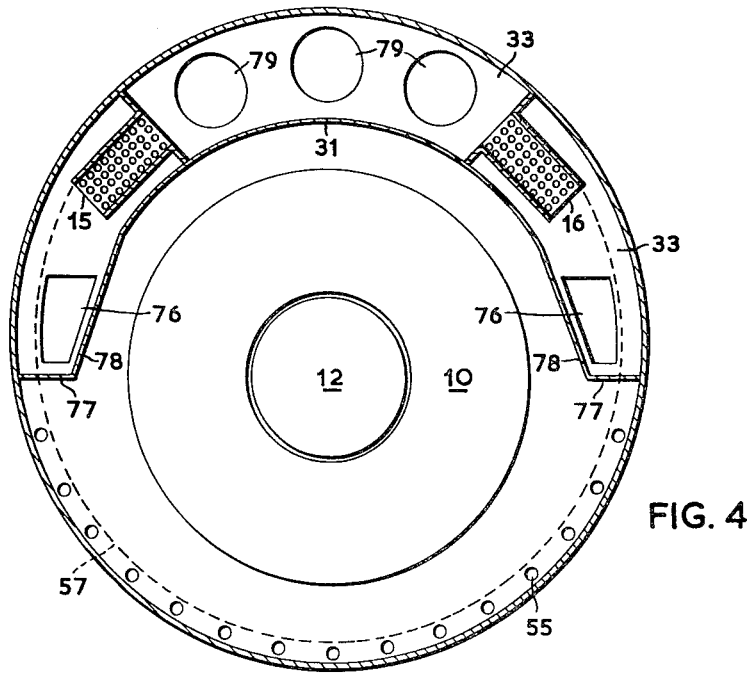
Figure 5:
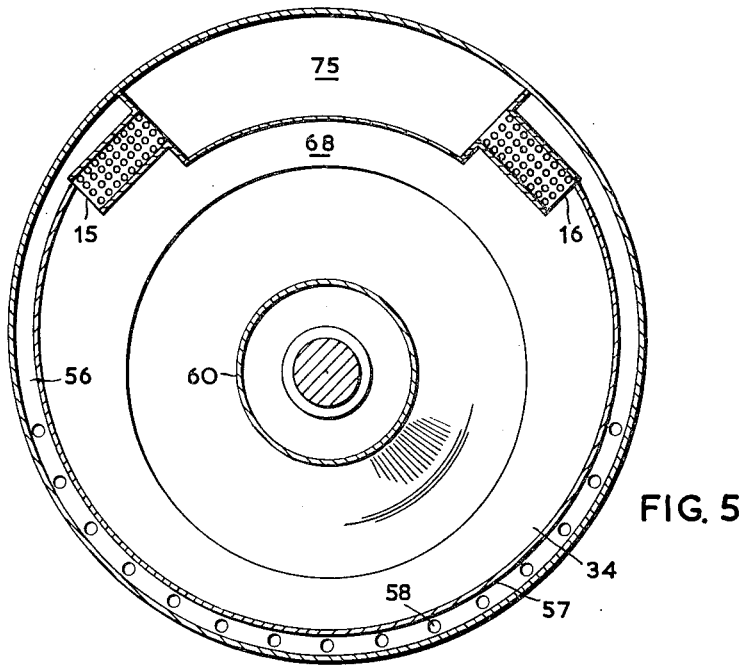

Mounted in the upper part of the stator frame are two circumferentially spaced coolers 15 and 16, as may best be seen in FIGS. 2 to 4, positioned one at each side of the vertical centre line of the machine.

Each cooler consists of a nest of tubes which extend axially from one end of the frame to the other for connection in an external cooling circuit. Each cooler is divided into two sections so far as hydrogen flow is concerned by a transverse baffle (not shown) aligned with a transverse frame plate 17.

The stator winding is generally indicated at 18 and is formed with hollow conductors. Liquid coolant is fed into the winding at one end thereof from two annular headers 19 and is exhausted at the other end of the winding into two outlet headers 20. The headers are connected to an external cooling circuit.

Hydrogen is circulated within the machine by a multi-stage blower 21 comprising a rotor 22 mounted on the alternator rotor and a stator 23 mounted on a frusto-conical support baffle 24. This baffle is itself mounted on an annular support baffle 25 in turn mounted on one of the frame plates 26.

Hydrogen, after absorbing heat from the machine, is cooled in two stages. The first stage cooling is effected by passing the hydrogen through the right-hand sections of the two coolers 15 and 16. It then passes through the blower to be fed to the left-hand sections of the coolers where the second stage cooling is effected and thence through the parts of the machine to be cooled back to the right-hand sections of the coolers, thus completing the circuit.

Thus, starting from the outlet side of the blower, the partially cooled hydrogen is fed into an annular chamber 27 formed between axially-spaced baffles 25 and 28. A frusto-conical baffle 30 carried by the baffle 28 forms a running seal with the rotor of the blower and serves to guide the hydrogen into the annular chamber 27. The outer circumference of this chamber is bounded by a baffle 31 which is cylindrical between the frame plates 29 and 32 but which between the frame plates 32 and 34 extends circumferentially only between the coolers 15 and 16, as shown most clearly in FIG. 3. The baffles 24 and 30 also form a diffuser on the outlet side of the blower.

The hydrogen then passes from the chamber 27 through a vent hole 35 in the baffle 31 into two ducts 36 and 37 which extend axially as far as the frame plate 17 and which are separated from each other by two axially-extending baffles 38 forming a central duct 39 extending as far as the frame plate 17 and closed at its outer end by a baffle 40. Vent holes 41 are provided in the frame plate 32 and in each of the intermediate frame plates 42 to allow for flow of hydrogen lengthwise within the ducts 36 and 37.

The hydrogen fed to the duct 36 then flows circumferentially through the left-hand section of the cooler 15 while the hydrogen fed to the duct 37 flows circumferentially in the opposite direction through the left-hand section of the cooler 16.

Over that part of the stator frame extending between the frame plates 32 and 33 the hydrogen has free access to the back of the stator core, vents 43 being provided in the frame plates 42, 17 and 44 to allow free flow by hydrogen lengthwise along the stator core, while over the part of the frame extending between the frame plates 29 and 32 the hydrogen enters two part annular chambers 45 and 46 communicating with each other through vents 47 in the frame plate 26 and with the space behind the stator core through vents 48 in the frame plate 32.

This completes the second stage cooling and some of the hydrogen now flows to the left-hand end of the rotor, some to the right-hand end of the rotor and some radially inwards through radial vents in the stator core.

The hydrogen flowing to the left-hand end of the rotor passes firstly through vents 49 in the frame plate 29 into a chamber 50 formed between the baffle 28 and the left-hand end of the stator frame. It then flows through axial holes 51 in the rotor of the blower 21 and through rotor cooling inlet holes 52 in the end cover 53 of the rotor end bell to the hollow conductors of the rotor winding.

The hydrogen flowing to the right-hand end of the rotor passes firstly through vents 55 in the frame plate 33 into a part annular chamber 56 formed between a cylindrical baffle 57, which extends axially between frame plates 33 and 34, and the outer cover of the stator frame. It then flows through vents 58 in the frame plate 34 into a chamber 59 formed between a frusto-conical baffle 60 and the right-hand end of the stator frame. A cylindrical baffle 61 carried by the baffle 60 forms a running seal with the end cover 62 of the right-hand rotor end bell 63.

The hydrogen in the annular chamber 59 then flows into the rotor through inlet holes not shown in the drawing but similar to the inlet holes 52 in the end cover 53.

The remainder of the hydrogen enters a group of axially spaced radial ducts 64 at the right end of the stator core and is fed along axial ducts 65 in the core to a group of axially spaced radial ducts 66 at the other end of the core and thence to the air gap.

The ducts of the group 64 are closed at the air gap end while the ducts of the group 66 are closed at the outer periphery of the stator core. A further group of axially spaced radial ducts 67, closed at the air gap end, is provided at each end of the core and the gas entering these ducts flows axially out of the core. The hydrogen entering the air gap via the group of ducts 66 flows axially along the air gap into an annular chamber 68 formed between the right-hand end of the stator core and the baffle 60.

Some of the hydrogen fed into the left-hand end of the rotor passes through the rotor winding overhang and is exhausted from the end cover 53 through outlet vents 69 into an annular chamber 70 formed between the left-hand end of the stator core and the baffle 25, while the remainder flows axially through the winding and is exhausted into the air gap through radial vents 71 in the rotor core.

Similarly some of the hydrogen entering the right-hand end of the rotor flows round the associated winding overhang and is exhausted from the end cover 62 via outlet vents 72 into the annular chamber 68 while the remainder flows axially through the rotor winding to be exhausted into the air gap via radial vents 73. This method of cooling the rotor winding is fully disclosed in our prior United States Patent No. 2,786,951. The hydrogen from the radial vents 71 and 73 also flows through the air gap to the annular chamber 68. An annular baffle 74 at the left-hand end of the stator prevents the blower 21 from drawing hot hydrogen from the air gap.

The hydrogen in the annular chamber 68 flows circumferentially upwards in opposite directions through the right-hand section of the coolers 15 and 16 into a chamber 75 at the top of the machine which extends between the frame plates 34 and 17, free access to the coolers being obtained along the full length of the cooler sections by means of vents 76 in the frame plates 33 and 44. Horizontal baffles 77 at each side of the machine together with sloping baffles 78 isolate the hydrogen flowing to the right-hand sections of the coolers from the hydrogen issuing from the left-hand sections of the coolers. Vent holes 79 in the frame plates 33 and 44 allow free circulation within the chamber 75. This completes the first stage cooling. The hydrogen then flows axially through a vent 80 in the frame plate 17 into the central duct 39 vents 81 being provided in the frame plates 42 and 32 to allow free circulation within this duct. The hydrogen then flows through a vent 82 in the cylindrical baffle 31 into the annular chamber 70. From this chamber the hydrogen is drawn directly into the blower 21, thus completing the circuit.

What we claim as our invention and desire to secure by Letters Patent is:

1. A dynamo-electric machine having a stator member including a magnetic core wound with a stator winding, a rotor member having a shaft, an air gap between the stator and rotor members, a gas-tight housing enclosing said members, a gaseous cooling medium within the housing, first and second stage cooling means within the housing for cooling the gaseous cooling medium, the first stage cooling means being disposed about the stator member near one end thereof, the second stage cooling means being disposed about the stator member near the other end thereof, a first set of radial ducts in the stator core adjacent one end thereof and communicating with the outside of the stator core, a second set of radial ducts in the stator core adjacent the other end thereof and communicating with the air gap, a set of axially extending ducts within the stator core communicating with the first and second sets of radial ducts, a blower mounted on the rotor shaft for circulating the gaseous cooling medium through the machine and the first and second stage cooling means; and gaseous cooling medium flow directing means for causing at least some of the gaseous cooling medium to circulate so as to pass through the first stage cooling means, then through the blower, then through the second stage cooling means and for causing some of the gaseous cooling medium issuing from the second stage cooling means to enter the said first set of radial ducts and to be returned to the first stage cooling means after it has traversed the axially extending ducts, the second set of radial ducts and substantially the whole length of the air gap.

2. A dynamo-electric machine according to claim 1 including a third set of radial ducts in the stator core disposed between said first set of radial ducts and the adjacent end of the stator core, a second set of axially extending ducts in the stator core communicating with the third set of radial ducts and extending from these ducts to the adjacent end of the stator core, a fourth set of radial ducts in the stator core disposed between the second set of radial ducts and the adjacent end of the stator core, and a third set of axially extending ducts in the stator core communicating with the fourth set of radial ducts and extending from these ducts to the adjacent end of the stator core, the gaseous cooling medium flow directing means being effective for causing the gaseous cooling medium to flow through the ends of the stator core via the third and fourth sets of radial ducts and the second and third sets of axially extending ducts.

3. A dynamo-electric machine according to claim 1 including means for enabling a separate cooling medium to be conveyed to and from the stator winding for separately cooling the said winding.

4. A dynamo-electric machine according to claim 1 including means for enabling a liquid cooling medium to be conveyed to and from the stator winding for separately cooling the said winding.

References Cited by the Examiner

UNITED STATES PATENTS 2,920,218    1/1960    Beckwith _____ 310—55

ORIS L. RADER, *Primary Examiner.*

DAVID X. SLINEY, MILTON O. HIRSHFIELD,
*Examiners.*